US006214440B1

(12) United States Patent
Peiffer et al.

(10) Patent No.: US 6,214,440 B1
(45) Date of Patent: Apr. 10, 2001

(54) COEXTRUDED, BIAXIALLY ORIENTED POLYESTER FILM FOR METALLIZING, ITS USE AND PROCESS FOR ITS PRODUCTION

(75) Inventors: Herbert Peiffer, Mainz; Richard Lee Davis, Wiesbaden; Joerg Hellmann, Mainz, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/429,371

(22) Filed: Oct. 28, 1999

(30) Foreign Application Priority Data

Oct. 29, 1998 (DE) .............................................. 198 49 661

(51) Int. Cl.$^7$ .............................. B32B 3/00; B32B 27/06; B32B 27/08; B32B 27/36

(52) U.S. Cl. .......................... 428/141; 428/216; 428/336; 428/457; 428/458; 428/480; 428/694 ST; 428/694 SG; 428/910; 156/244.24; 264/290.2

(58) Field of Search .................................... 428/141, 213, 428/215, 216, 334, 335, 336, 457, 458, 480, 694 ST, 694 SG, 910; 156/244.24; 264/290.2

(56) References Cited

U.S. PATENT DOCUMENTS

| | | |
|---|---|---|
| 3,515,626 | 6/1970 | Duffield . |
| 3,958,064 | 5/1976 | Brekken et al. . |
| 4,042,569 | 8/1977 | Bell et al. . |
| 4,252,885 | 2/1981 | McGrail et al. . |
| 4,399,179 | 8/1983 | Minami et al. . |
| 4,493,872 | 1/1985 | Funderburk et al. . |
| 4,615,939 | 10/1986 | Corsi et al. . |
| 4,622,237 | 11/1986 | Lori . |
| 5,236,680 | 8/1993 | Nakazawa et al. . |
| 5,236,683 | 8/1993 | Nakazawa et al. . |
| 5,242,757 | 9/1993 | Buisine et al. . |
| 5,429,785 | 7/1995 | Jolliffe . |
| 5,453,260 | 9/1995 | Nakazawa et al. . |
| 5,468,527 | 11/1995 | Peiffer et al. . |
| 5,506,014 | 4/1996 | Minnick . |

FOREIGN PATENT DOCUMENTS

| | | |
|---|---|---|
| 1694404 | 4/1971 | (DE) . |
| 2230970 | 2/1973 | (DE) . |
| 3801535 | 7/1988 | (DE) . |
| 4306155 | 9/1994 | (DE) . |
| 0 035 835 | 9/1981 | (EP) . |
| 0 061 769 | 10/1982 | (EP) . |
| 0 088 635 | 9/1983 | (EP) . |
| 0 124 291 | 11/1984 | (EP) . |
| 0 135 451 | 3/1985 | (EP) . |
| 0 144 878 | 6/1985 | (EP) . |
| 0 236 945 | 9/1987 | (EP) . |
| 0 296 620 | 12/1988 | (EP) . |
| 0 347 646 | 12/1989 | (EP) . |
| 0 378 154 | 7/1990 | (EP) . |
| 0 378 955 | 7/1990 | (EP) . |
| 0 402 861 | 12/1990 | (EP) . |
| 0 490 665 | 6/1992 | (EP) . |
| 0 502 745 | 9/1992 | (EP) . |
| 0 514 129 | 11/1992 | (EP) . |
| 0 515 096 | 11/1992 | (EP) . |
| 0 580 404 | 1/1994 | (EP) . |
| 0 602 964 | 6/1994 | (EP) . |
| 0 604 057 | 6/1994 | (EP) . |
| 0 609 060 | 8/1994 | (EP) . |
| 0 612 790 | 8/1994 | (EP) . |
| 0 659 810 | 6/1995 | (EP) . |
| 0 663 286 | 7/1995 | (EP) . |
| 0 685 509 | 12/1995 | (EP) . |
| 0 707 979 | 4/1996 | (EP) . |

(List continued on next page.)

OTHER PUBLICATIONS

Kimura, F. et al., *FTIR Spectroscopic Study on Crystallization Process of Poly (ethylene–2,6–naphthalate)*, 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/19918 (1998).

Database WPI, Section Ch, Week 9615, Derwent Publication Ltd., London, GB; Class A23, AN 96–148338, XP002114377 & JP 0803679 A (Toray Indus., Inc.) (Feb. 6, 1996).

Database WPI, Section Ch, Week 9522, Derwent Publications Ltd., London, GB; Class A32, AN 95–166866, XP002114408 & JP 07 088952 A (Toray Indus., Inc.) (Apr. 4, 1995).

Weiss, J., *Parameters that influence the barrier properties of metallized polyester and polypropylene films*, 204 Thin Solid Films 203–216 (1991).

*Primary Examiner*—Vivian Chen
(74) *Attorney, Agent, or Firm*—Finnegan, Henderson, Farabow, Garrett & Dunner, L.L.P.

(57) ABSTRACT

The invention relates to a biaxially oriented polyester film which, after metallization, has low oxygen permeation and good adhesion to the metallization, and is composed of at least one base layer B and, applied to this base layer, at least one layer A, where this layer A i) has, per $mm^2$ of film surface, a number N of elevations whose respective heights h and diameters d are correlated by the following equations:

$$\log N/mm^2 < A_h - B_h * \log h/\mu m, \; 0.05 \; \mu m < h < 1.0 \; \mu m \quad (1)$$

wherein $A_h = 1.4$; $B_h = 2.5$ $$\log N/mm^2 < A_d - B_d * \log d/\mu m, \; 0.2 \; \mu m < d < 10.0 \; \mu m \quad (2)$$

wherein $A_d = 3.4$; $B_d = 2.4$ and ii) has a copolyester coating derived from isophthalic acid and a sulfomonomer.

13 Claims, No Drawings

FOREIGN PATENT DOCUMENTS

| | | |
|---|---|---|
| 0 826 478 | 3/1998 | (EP) . |
| 0 878 298 | 11/1998 | (EP) . |
| 9-277475 * | 10/1997 | (JP) . |
| WO 94/13476 | 6/1994 | (WO) . |
| WO 94/13481 | 6/1994 | (WO) . |
| WO 98/13414 | 4/1998 | (WO) . |
| WO 98/13415 | 4/1998 | (WO) . |
| WO 88/10188 | 12/1998 | (WO) . |

* cited by examiner

COEXTRUDED, BIAXIALLY ORIENTED POLYESTER FILM FOR METALLIZING, ITS USE AND PROCESS FOR ITS PRODUCTION

FIELD OF THE INVENTION

The invention relates to a coextruded, biaxially oriented polyester film which, after metalization, has low oxygen permeation and good adhesion to the metalization, and which is composed of at least one base layer B and, applied to this base layer, at least one layer A, where this layer A has a defined number of elevations and a copolyester coating. The invention further relates to the use of the film and to a process for its production.

BACKGROUND OF THE INVENTION

Food and drink packaging frequently requires a high level of barrier action with respect to gases, water vapor and flavors (meaning low permeability or low permeation). A process frequently used to produce packaging of this type involves treating the plastic films used by metalization or high-vacuum deposition with aluminum.

Metalized films have good barrier properties. Therefore, these films are used in particular to pack foods and other consumable items for which long storage or transport times pose a risk that, if the barrier is inadequate, the packaged foods may spoil, become rancid or lose flavor. This applies, for example, to coffee, snacks containing fats (nuts, chips, etc.), and to drinks containing carbon dioxide (in pouches).

Where polyester films with a metalized aluminum layer are to be used as a packaging material, they are generally a constituent of a composite film with two or more layers (laminate). The inner side (i.e., the side facing the contents) of the bags is sealed, and the sealable layer is generally composed of polyethylene or polypropylene. A typical structure here for the film composite is as follows: polyester layer/aluminum layer/adhesive layer/sealable layer.

For a laminate thickness of from about 50 to 150 $\mu$m, the thickness of the metal layer is only from 10 to 80 nm. Although this functional layer is very thin, it is sufficient to give adequate protection from light and to achieve very good barrier properties.

Detailed results of studies of the effect of substrate surface on barrier properties in polyester films can be found in the dissertation by H. Utz (Munich Technical University 1995: "Barriereeigenschaften aluminiumbedampfter Kunststoffolien" (Barrier properties of aluminum-metalized plastic films).

EP 0 144 878 describes a polyester film which, in order to improve adhesion to the metalized layer, has a polyester coating which is applied to the film during the production process in the form of an aqueous dispersion. A disadvantage here is that polyester coating leads to a marked deterioration in the barrier effectiveness of the metalized film.

However, for many applications it is desirable to provide a film which has both good barrier properties and also good adhesion capability with respect to the metalization.

SUMMARY OF THE INVENTION

It was therefore an object of the present invention to provide a coextruded, biaxially oriented polyester film which, after metalization, has a high level of oxygen barrier properties and of adhesion to the metalization. In addition, the film is to have good optical properties and good processing performance. In summary, the object was to provide a film with the following combination of features:

- low oxygen permeation of the polyester film after metalization
- high adhesion between the polyester film and the metalization
- high gloss and low haze
- low coefficients of friction (no blocking of the film with itself).

DESCRIPTION OF THE PREFERRED EMBODIMENTS

The object has been achieved by means of a coextruded, biaxially oriented polyester film with a base layer B, at least 80% by weight of which is composed of a thermoplastic polymer, and with one or more other layers, where at least one outward-facing layer A i) has, per $mm^2$ of film surface, a number N of elevations whose respective heights h and diameters d are correlated by the following equations $$\log N/mm^2 < A_h - B_h * \log h/\mu m, \quad 0.05 \ \mu m < h < 1.0 \ \mu m \quad (1)$$

$A_h = 1.4; \ B_h = 2.5$ $$\log N/mm^2 < A_d - B_d * \log d/\mu m, \quad 0.2 \ \mu m < d < 10.0 \ \mu m \quad (2)$$

$A_d = 3.4; \ B_d = 2.4$ and ii) has a copolyester coating composed of the condensation product of the following monomers and/or of their derivatives capable of forming polyesters:
A) from 65 to 95 mol % of isophthalic acid;
B) from 0 to 30 mol % of at least one aliphatic dicarboxylic acid of formula

HOOC(CH$_2$)$_n$COOH, where
n is from 1 to 11;
C) from 5 to 15 mol % of at least one sulfomonomer containing an alkali metal sulfonate group on the aromatic moiety of a dicarboxylic acid;
D) a copolymerizable aliphatic or cycloaliphatic glycol having 2 to 11 carbon atoms in the stoichiometric amount necessary to form 100 mol % of condensate; where each of the percentages given is based on the total amount of the monomers forming the polyester coating.

For the purposes of the present invention, elevations are cone-shaped elevations which protrude from the planar film surface.

To achieve low oxygen permeation, as required by the object of the invention, in a film coated with the copolyester layer described above and metalized, the number N of elevations per $mm^2$ of film surface A must be less than a certain value, as required by equations (1) and (2). This value is established by the right-hand sides of equations (1) and (2) as a function of the height h and diameter d of the elevations.

Biaxially oriented polyester films described by the above equations have a comparatively small number of elevations in the layer A to be metalized. The number of elevations in the range h<0.5 $\mu$m, particularly in the range h<0.4 $\mu$m and very particularly in the range h<0.3 $\mu$m, is markedly smaller than is known in the prior art.

If the density of elevations N/mm$^2$ is low, then the barrier in the sense given above is good, whereas if the density of elevations is high, the barrier in the sense given above is poor.

In a preferred embodiment of the novel film the constant Ah in the above mentioned equation (1) has the value $A_h=1.18$. In a particularly preferred embodiment, it has the value $A_h=1.0$. Likewise, in a preferred embodiment of the novel film, the constant $B_h$ in the abovementioned equation (1) has the value $B_h=2.2$, and in a particularly preferred embodiment it has the value $B_h=2.1$.

In a preferred embodiment of the novel film the constant $A_d$ in the abovementioned equation (2) has the value $A_d=3.0$. In a particularly preferred embodiment, it has the value $A_d=2.6$. Likewise, in a preferred embodiment, the constant $B_d$ in the abovementioned equation (2) has the value $B_d=2.3$, and in a particularly preferred embodiment it has the value $B_d=2.2$.

The coating copolyesters are prepared by polycondensation of A) isophthalic acid, B) an aliphatic dicarboxylic acid of formula

where
n is from 1 to 11,
C) a sulfomonomer containing an alkali metal sulfonate group on the aromatic moiety of an aromatic dicarboxylic acid, and D) at least one aliphatic or cycloaliphatic alkylene glycol having from about 2 to 11 carbon atoms. The total of the acid equivalents present, on a molar basis, should essentially correspond to the total of glycol equivalents present.

Examples of dicarboxylic acids suitable as component B) of the copolyesters are malonic, adipic, azelaic, glutaric, sebacic, suberic, succinic and brassylic acids, and also mixtures of these acids or of their derivatives capable of forming polyesters. Among the acids mentioned preference is given to sebacic acid.

Examples of sulfomonomers which contain a metal sulfonate group on the aromatic moiety of an aromatic dicarboxylic acid (component C) are monomers of the following formula:

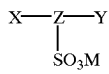

In this formula
M is a monovalent cation of an alkali metal,
Z is a trivalent aromatic radical, and
X and Y are carboxyl groups or polyester-forming equivalents.

Monomers of this type are described in U.S. Pat. Nos. 3,563,942 and 3,779,993. Examples of monomers of this type are the sodium salts of sulfoterephthalic acid, of 5-sulfoisophthalic acid, of sulfophthalic acid, of 5-(p-sulfophenoxy)isophthalic acid, of 5-(sulfopropoxy)-isophthalic acid and of similar monomers, and other examples are the derivatives of these, for example, the dimethyl esters, which are capable of forming polyesters. M is preferably $Na^+$, $Li^+$ or $K^+$.

The term "derivatives capable of forming polyesters" here means reaction participants with groups capable of undergoing condensation reactions, in particular transesterification reactions, to form polyester bonds. Such groups include carboxyl groups and also the lower alkyl esters of these, e.g. dimethyl terephthalate, diethyl terephthalate and numerous other esters, halides and salts. The acid monomers are preferably used in the form of dimethyl esters, since this allows better control of the condensation reaction.

Examples of glycols suitable as component D) are ethylene glycol, 1,5-pentanediol, 1,6-hexanediol, neopentyl glycol, 1,10-decanediol, cyclohexanedimethanol and similar substances, preferably ethylene glycol.

The copolyesters may be prepared by known polymerization techniques. The procedure is generally to bring the acid components and glycol together and heat in the presence of an esterification catalyst, followed by addition of a polycondensation catalyst.

It has been found that the relative proportions of components A, B, C and D used to prepare the mixtures are decisive for achieving a coated film with good adhesion to a metal applied by metalization processes. For example, in the acid components at least about 65 mol % must be isophthalic acid (component A). Component A is preferably from about 70 to 95 mol % of pure isophthalic acid.

For component B, any acid of the formula mentioned gives satisfactory results, but preference is given to adipic, azelaic, sebacic, malonic, succinic and glutaric acids and mixtures of these acids.

Within the range given the desirable amount, if component B is present in the composition, is preferably from 1 to 20 mol %, based on the acid components of the polyester coating.

The amount of the glycol component present is approximately stoichiometric.

Copolyesters suitable for the purposes of the invention also have an acid number of less than 10, preferably of from 0 to 3, an average molecular weight of less than about 50,000, and a solution viscosity of from about 30 to 700, preferably from about 350 to 650.

The subclaims give preferred embodiments of the invention, and these are also described below.

According to the invention the film has at least two layers (without the copolyester coating). Its layers are then a layer B and layer A. In a preferred embodiment of the invention, the film has a three-layer structure and one side of layer B (=base layer) has the layer A and the other side of layer B has another layer C made from polyethylene terephthalate and comprising the pigments advantageous for the production and processing of the film. In this case, layers A and C form the outer layers A and C.

In principle, various raw materials may be used as the materials for the various layers. However, the individual layers are preferably produced from polyester raw materials.

At least 90% by weight of the base layer B of the film is preferably a thermoplastic polyester. Polyesters suitable for this are those made from ethylene glycol and terephthalic acid (polyethylene terephthalate, PET), from ethylene glycol and naphthalene-2,6-dicarboxylic acid (=polyethylene 2,6-naphthalate, PEN), from 1,4-bis(hydroxymethyl) cyclohexane and terephthalic acid (=poly-1,4-cyclohexanedimethylene terephthalate, PCDT), and also made from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters comprising at least 90 mol %, preferably at least 95 mol %, of ethylene glycol units and terephthalic acid units or of ethylene glycol units and naphthalene-2,6-dicarboxylic acid units. The remainder of the monomer units derive from those other aliphatic, cycloaliphatic or aromatic diols and dicarboxylic acids which may also occur in layer A (or layer C).

Examples of other suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), and branched aliphatic glycols having up to 6 carbon atoms. Among the cycloaliphatic diols, mention should be made of cyclohexanediols (in particular 1,4-cyclohexanediol). Other suitable aromatic diols have, for example, the formula HO—$C_6H_4$—X—$C_6H_4$—OH, where X is —$CH_2$—, —$C(CH_3)_2$—, —$C(CF_3)_2$—, —O—, —S— or —$SO_2$—. Other suitable compounds are bisphenols of the formula HO—$C_6H_4$—$C_6H_4$—OH.

Other preferred aromatic dicarboxylic acids are benzenedicarboxylic acids, naphthalenedicarboxylic acids (for example naphthalene- 1,4- or - 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention should be made of cyclohexanedicarboxylic acids (in particular cyclohexane-1,4-dicarboxylic acid). Particularly suitable aliphatic dicarboxylic acids are the $C_3$–$C_{19}$ alkanedioic acids, where the alkane moiety may be straight-chain or branched.

The polyesters may be prepared by the transesterification process. The starting materials are dicarboxylic esters and diols, which are reacted with the usual transesterification catalysts, such as salts of zinc, of calcium, of lithium, of magnesium or of manganese. The intermediate products are then polycondensed in the presence of well known polycondensation catalysts, such as antimony trioxide or titanium salts. The direct esterification process in the presence of polycondensation catalysts is equally suitable for this preparation, starting directly from the dicarboxylic acids and the diols.

In principle, the polymers used for layer A may be the same as those also used for the base layer. In addition, other materials may also be present in layer A, and layer A is then preferably composed of a mixture of polymers, a copolymer or a homopolymer which comprise ethylene 2,6-naphthalate units and ethylene terephthalate units. Up to 10 mol % of the polymers may be composed of other comonomers (see above).

For the other layer (outer layer C), or for any intermediate layers which may be present, the polymers used may in principle be those already described for base layer B and layer A.

The base layer and the other layer(s) may also comprise conventional additives, such as stabilizers and/or antiblocking agents. They are usefully added to the polymer or to the polymer mixture before the melting process. Examples of stabilizers used are phosphorus compounds, such as phosphoric acid or phosphate esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc or manganese salts of the dicarboxylic acids used, carbon black, titanium dioxide, kaolin, crosslinked polystyrene particles or crosslinked acrylate particles.

The antiblocking agents used may also comprise mixtures of two or more different antiblocking agents, or mixtures of antiblocking agents of the same composition but of different particle size. The particles may be added to the individual layers in advantageous concentrations for each case, for example, as a glycolic dispersion during the polycondensation or via masterbatches during extrusion. Pigment concentrations of from 0 to 5% by weight have proven particularly suitable.

A detailed description of the antiblocking agents which can be used may be found, for example, in EP-A-0 602 964.

To fulfill equations (1) and (2), layer A according to the invention is generally filled only to a small extent, or not at all, with inert pigments. The concentration of the inert particles in layer A is from 0 to 0.08% by weight, preferably from 0 to 0.065% by weight, in particular from 0 to 0.05% by weight and very particularly preferably from 0 to 0.04% by weight, depending essentially on the size of the particles used. Preferred particles are $SiO_2$ in colloidal or chain-type form. There is no limitation in principle on the particle diameters of the particles used. However, in achieving the object of the present invention, it has proven useful to use particles with an average primary particle diameter of less than 60 nm, preferably less than 55 nm and particularly preferably less than 50 nm and/or particles with an average primary particle diameter of more than 1 $\mu$m, preferably more than 1.5 $\mu$m, and particularly preferably more than 2 $\mu$m.

The pigmentation of the individual layers not relating to layer A may then be of a wide variety, depending essentially on the film structure (layer structure) and the requirements placed upon the film in relation to achievement of the other optical properties (haze), and on its performance in production and processing.

In the case of, for example, the preferred three-layer film with base layer B and two outer layers A and C, the particle concentration in the base layer B is preferably lower than in the second outer layer C. For a three-layer film of this type, the particle concentration in the base layer B is from 0 to 0.06% by weight, preferably from 0 to 0.04% by weight, in particular from 0 to 0.03% by weight and very particularly preferably from 0 to 0.02% by weight. There is in principle no limitation on the diameter of the particles used, but particular preference is given to particles with an average diameter greater than 1 $\mu$m.

If the film has a two-layer structure, where, for example, layer A makes up more than 50%, in particular more than 65% and particularly preferably more than 80% of the total film thickness, layer B can be much more strongly pigmented (higher pigment concentration) than in the other case in which the thickness of layer A is comparatively low (<50%).

In a particularly preferred embodiment, the novel coextruded polyester film has a three-layer structure and then also comprises a layer C. The two layers A and C then form the outer layers A and C. The structure, thickness and composition of the second outer layer C may be selected independently of the outer layer A already present, and the second outer layer may also comprise the polymers or polymer mixtures mentioned above, but these do not have to be identical with those of the first outer layer. The second outer layer may also comprise other frequently used outer layer polymers. This second outer layer generally comprises more pigments (i.e., higher pigment concentrations) than the first outer layer A. The pigment concentration in this second outer layer is from 0.02 to 0.6%, advantageously from 0.025 to 0.5%, in particular from 0.03 to 0.4% and very particularly preferably from 0.035 to 0.3%. It depends, for example, on the processing performance desired from the film. The pigment type(s), pigment concentration(s), and also the thickness ratios of the layers, and particle concentration(s) are preferably selected so as to give good optical properties, and also to give easy production and processing of the film.

It has been found advantageous to use the following parameters to describe layer C:

a) average roughness $R_{a,C}$
b) coefficient of static/sliding friction $\mu_C$ of this side with respect to itself and
c) number of elevations $N_C/mm^2$.

The film is advantageously constructed so that on the surface of layer C (or of layer B in the case of a two-layer film) which faces away from outer layer A
a) $R_a$ is from 20 to 150 nm
b) the coefficient of static/sliding friction $\mu_C$ of this layer with respect to itself is less than 0.6 and
c) the number of elevations $N_c/mm^2$ is expressed by the equations $$A_{h2}-B_{h2}*\log h/\mu m < \log (Nc/mm^2) < A_{h3}-B_{h3}*\log h/\mu m \quad (3)$$

0.05 $\mu$m<h<1.0 $\mu$m
$A_{h2}=-1.000$; $B_{h2}=3.70$
$A_{h3}=2.477$; $B_{h3}=2.22$ $$A_{d2}-B_{d2}*\log d/\mu m < \log (Nc/mm^2) < A_{d3}-B_{d3}*\log d/\mu m \quad (4)$$

0.2 $\mu$m<d<10.0 $\mu$m
$A_{d2}=1.700$; $B_{d2}=3.86$
$A_{d3}=4.700$; $B_{d3}=2.70$

In a preferred embodiment $R_a$ is from 30 to 100 nm, in particular from 35 to 80 nm.

In a preferred embodiment the coefficient of static/sliding friction $\mu_C$ of this layer with respect to itself is less than 0.55 and in particular less than 0.50.

In a preferred embodiment, the constants $A_{h2}$ to $B_{h3}$ in equation (3) have the values $A_{h2}=-0.523$, $B_{h2}=3.523$, $A_{h3}=2.300$ and $B_{h3}=2.3$. In another preferred embodiment, the values are $A_{h2}=0.00$, $B_{h2}=3.300$, $A_{h3}=2.000$ and $B_{h3}=2.400$, and the particularly preferably $A_{h2}=1.420$, $B_{h2}=2.500$, $A_{h3}=2.000$ and $B_{h3}=3.000$.

In a preferred embodiment, the constants $A_{d2}$ to $B_{d3}$ in equation (4) have the values $A_{d2}=2.00$, $B_{d2}=3.630$, $A_{d3}=4.40$ and $B_{d3}=2.70$. In a preferred embodiment, the values are $A_{d2}=2.400$, $B_{d2}=3.720$, $A_{d3}=4.000$ and $B_{d3}=2.600$, and the values are particularly preferably $A_{d2}=3.400$, $B_{d2}=2.400$, $A_{d3}=4.000$ and $B_{d3}=3.300$.

Between the base layer and the outer layer(s) if desired there may also be an intermediate layer. This intermediate layer may again be composed of the polymers described for the base layer. In a particularly preferred embodiment, it is composed of the polyesters used for the base layer. It may also comprise the conventional additives described. The thickness of the intermediate layer is generally more than 0.3 $\mu$m, and is preferably from 0.5 to 15 $\mu$m, in particular from 1.0 to 10 $\mu$m, and very particularly preferably from 1.0 to 5 $\mu$m.

In the particularly advantageous three-layer embodiment of the novel film, the thickness of the outer layer(s) A (and C) is generally greater than or equal to 0.1 $\mu$m and is generally 0.2 to 3.0 $\mu$m, advantageously from 0.2 to 2.5 $\mu$m, in particular from 0.3 to 2 $\mu$m, and very particularly preferably from 0.3 to 1.5 $\mu$m, and the thicknesses of the outer layers A and C may be identical or different.

The total thickness of the novel polyester film may vary within wide limits and depends on the intended application. It is from 4 to 50 $\mu$m, in particular from 5 to 45 $\mu$m, preferably from 6 to 40 $\mu$m, and the proportion of the total thickness made up by layer B is preferably from 5 to 90%.

To produce layers A and C (outer layer(s) A and C), it is useful to feed pellets of polyethylene terephthalate to one or two extruders. The materials are extruded after melting at about 300° C.

The polymers for the base layer B are usefully fed via another extruder. Any foreign bodies or contamination which may be present can be filtered off from the polymer melt prior to extrusion. The melts are then extruded through a coextrusion die to give flat melt films and laid one upon the other. The coextruded film is then drawn off and solidified with the aid of a chill roll and, if desired, other rolls.

The biaxial orientation procedure is generally carried out sequentially. For this, the first orientation is preferably longitudinal (i.e., in the machine direction), followed by transverse orientation (i.e., perpendicularly to the machine direction). This orients the molecular chains. The longitudinal orientation procedure can be carried out with the aid of two rolls running at different speeds corresponding to the stretching ratio desired. The transverse orientation procedure usually utilizes an appropriate tenter frame.

The temperature for the orientation procedure may vary over a relatively wide range and depends on the film properties desired. The longitudinal stretching procedure is generally carried out at from 80 to 130° C., and the transverse stretching procedure at from 90 to 150° C. The longitudinal stretching ratio is generally from 2.5:1 to 6:1, preferably from 3:1 to 5.5:1. The transverse stretching ratio is generally from 3.0:1 to 5.0:1, preferably from 3.5:1 to 4.5:1.

In the heat-setting procedure which follows, the film is held at a temperature of from 150 to 250° C. for a time period from 0.1 to 10 s. The film is then wound up in a usual manner.

The copolyester coating in the form of an aqueous dispersion may be applied in-line at any stage of production of the film. In a particular embodiment, the coating is applied to film surface A after the longitudinal stretching procedure but before the transverse stretching procedure. The dispersion is particularly preferably applied here using reverse gravure-roll coating, which allows the coatings to be applied extremely homogeneously at the desired thicknesses (from 5 to 100 nm). The coating gives the film surface the additional function desired, i.e., it markedly improves adhesion to the metalization.

The copolyester coating mentioned is preferably applied in the form of an aqueous dispersion to film surface A, and the dispersion medium is then evaporated. If the coating is applied prior to transverse stretching, the heat treatment during transverse stretching is usually sufficient to evaporate the dispersion medium and to dry the coating. The thickness of the dried coating is then from 5 to 100 nm, preferably from 20 to 70 nm, in particular from 30 to 50 nm.

One or both sides of the biaxially stretched and heat-set polyester film may be corona- or flame-treated prior to printing or to application of the metallic layer. The intensity of treatment selected is such that the surface tension of the film is generally above 50 mN/m.

If desired, the metal layer is applied in conventional industrial equipment. Metal layers made from aluminum are usually produced by metalizing in conventional metalizers (boat method). The process parameters for the equipment during application of the metal layer to the films correspond to the standard conditions. The films are preferably metalized in such a way that the optical density of the metalized films is in the usual range of from about 2.2 to 3.0. For all settings of variables the web speed of the film to be coated is usually from 5 to 20 m/s.

To achieve other desired properties the film may be corona- and/or flame-pretreated.

An advantage of the invention is that the production costs of the novel film are comparable with those of the prior art.

The other properties of the novel film relevant to its processing and use are essentially unchanged, or are even improved. In addition, the invention provides that recycled material can be reused during production of the film at a concentration of from 20 to 60% by weight, based on the total weight of the film, without any significant adverse effect on the physical properties of the film.

The film is highly suitable for packaging foods and other consumable items which could be damaged by light and/or by air. It is particularly suitable for producing vacuum packaging for coffee, in particular ground coffee.

In summary, the novel coextruded and coated film has high gloss and low haze. The film also has low oxygen permeation once the coated film surface A has been metalized. The adhesion between the metalization and the film is excellent. The film also has good winding and processing performance.

The gloss of film surface A is greater than 160. In a preferred embodiment, the gloss of this side is greater than 170, and in a particularly preferred embodiment it is greater than 180.

The haze of the film is lower than 2.5. In a preferred embodiment, the haze of the film is lower than 2.2, and in a particularly preferred embodiment it is lower than 2.0.

The oxygen permeability of the film is less than $1.2$ g m$^{-2}$ d$^{-1}$ bar$^{-1}$, preferably less than $1.0$ g m$^{-2}$ d$^{-1}$ bar$^{-1}$ and particularly preferably less than $0.9$ g m$^{-2}$ d$^{-1}$ bar$^{-1}$, after the copolyestercoated film surface A has been metalized.

The adhesion of the film to metal is greater than 2.0 N/15 mm, preferably greater than 2.4 N/15 mm and very preferably greater than 2.8 N/15 mm.

The coefficient of friction on the side facing away from side A is less than 0.6. In a preferred embodiment, the coefficient of friction of that side of the film is less than 0.55, and in a particularly preferred embodiment it is less than 0.5.

The table below (Table 1) again gives the most important film properties according to the invention.

TABLE 1

| | Range according to the invention | Preferred | Particularly preferred | Unit | Method of measurement |
|---|---|---|---|---|---|
| Gloss, side A (measurement angle 20°)[i)] | >160 | >170 | >180 | | DIN 67 530 |
| Haze[i)] | <2.5 | <2.2 | <2.0 | % | ASTM-D 1003-52 |
| Oxygen permeation of the metalized film | <1.2 | <1.0 | <0.90 | g m$^{-2}$d$^{-1}$ bar$^{-1}$ | DIN 53 380 Part 3 |
| Adhesion between film surface A and the metal layer | >2.0 | >2.4 | >2.8 | N/15 mm | EAA peel test |
| Coefficient of friction: side C or, respectively, B, with respect to itself | <0.6 | <0.55 | <0.50 | | DIN 53 375 |
| Average roughness R$_a$ side C or, respectively, B | 20–150 | 30–100 | 35–80 | nm | DIN 4768, with a cut-off of 0.25 mm |

[i)]measured on the unmetalized film

The following methods were utilized to characterize the raw materials and the films:

(1) Optical Density

The Macbeth TD-904 densitometer from Macbeth (division of Kollmorgen Instruments Corp.) was used to measure optical density. The optical density is defined as OD=−1 g I/I$_0$, where I is the intensity of the incident light and I$_0$ is the intensity of the emitted light and I/I$_0$ is the transmittance.

(2) Oxygen Permeation

The oxygen permeation was measured on the metalized films using an OXTRAN 2/20 from Mocon Modem Controls (USA) in accordance with DIN 53 380, Part 3.

(3) SV

To determine the SV (solution viscosity) a polyester specimen was dissolved in a solvent (dichloroacetic acid). The viscosity of this solution, and also the viscosity of the pure solvent, were measured in a Ubbelohde viscometer. The quotient was calculated from the two values, 1.000 subtracted from this and the resultant value multiplied by 1000 to give the SV.

(4) Coefficient of Friction

The coefficient of friction was determined in accordance with DIN 53 375, 14 days after production. Blocking occurs if the coefficient of friction is greater than 1 or if discontinuities occur in the curve of frictional force against displacement when the frictional force is measured.

(5) Haze

The haze of the film was measured in accordance with ASTM-D 1003-52. Hölz haze was measured by a method based on ASTM-D 1003-52, but in order to utilize the most effective measurement range measurements were made after placing four pieces of film one on top of the other and a 10° slit diaphragm was used instead of a 40° pin hole.

(6) Gloss

Gloss was determined in accordance with DIN 67 530. The reflectance was measured as an optical value characteristic of the surface of a film. Based on the Standards ASTM-D 523-78 and ISO 2813, the angle of incidence was set at 20 or 60°. A beam of light hits the flat test surface at the set angle of incidence and is reflected and/or scattered thereby. A proportional electrical variable is displayed representing the light rays hitting the photoelectric detector. The value measured is dimensionless and must be stated together with the angle of incidence.

(7) Determination of Particle Sizes on Film Surfaces

A scanning electron microscope and an image analysis system were used to determine the size distribution of elevations on film surfaces. The Philips XL30 CP scanning electron microscope is used with an integrated image analysis program: AnalySIS from Soft-Imaging System.

For these measurements, specimens of film are placed flat on a specimen holder. These are then metalized obliquely at an angle α with a thin metallic layer (e.g., of silver). Alpha (α) here is the angle between the surface of the specimen and the direction of diffusion of the metal vapor. This oblique metalization throws a shadow behind the elevation. Since the shadows are not at this stage electrically conductive, the specimen is then further sputtered or metalized with a second metal (e.g., gold), the second coating here impacting vertically onto the surface of the specimen so that the second coating does not give any shadows.

Scanning electron microscope (SEM) images are taken of the specimen surfaces prepared in this way. The shadows of the elevations are visible due to the contrast created by the metallic materials. The specimen is oriented in the SEM so that the shadows run parallel to one edge of the image. The conditions set in the SEM for recording the image are as follows: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The shadow lengths are measured using the image analysis. The threshold value for shadow identification is set at the point where the second derivative of the gray value distribution of the image passes through the zero point. Prior to shadow identification, the image is smoothed with an N×N filter (size 3, 1 iteration). A frame is set so as to ensure that elevations which are not reproduced in their entirety in the image are not included in the measurements. The enlargement, the size of frame, and the number of images evaluated are selected in such a way as to give a total film surface of 0.36 mm² for evaluation.

The height of the individual elevations is computed from the individual shadow lengths using the following relationship:

h=(tan α)*L where h is the height of the elevation, α is the metalization angle and L is the shadow length. The elevations recorded in this way are classified so as to arrive at a frequency distribution. The classification is into classes of 0.05 μm width between 0 and 1 μm, the smallest class (from 0 to 0.05 μm) not being used for further evaluation calculations. The diameters of the elevations (the spread in the direction perpendicular to that in which the shadow is thrown) are graded similarly into classes of 0.2 μm width from 0 to 10 μm, the smallest class here again being used for further evaluation.

(8) Roughness

The roughness $R_a$ of the film was determined in accordance with DIN 4768 with a cutoff of 0.25 mm.

(9) Adhesion to Metal

Adhesion to metal was determined by a method based on the Fraunhofer EAA peel test. A detailed description of this test is given in *Coating* 12/97, pp. 446–450.

EXAMPLE 1

Chips made from polyethylene terephthalate (prepared by the transesterification process with Mn as transesterification catalyst, Mn concentration: 100 ppm) were dried at 160° C. to residual moisture of less than 100 ppm and fed to the extruder for base layer B.

Alongside this, chips made from polyethylene terephthalate (prepared by the transesterification process with Mn as transesterification catalyst, Mn concentration: 100 ppm) which had been pigmented as given in Table 2 were also dried at 160° C. to a residual moisture of less than 100 ppm and fed to the respective extruders for outer layers A and C.

Coextrusion followed by stepwise longitudinal and transverse orientation was used to produce a transparent three-layer film of ABC structure and with a total thickness of 12 μm. The thickness of the individual layers is given in Table 2.

Outer layer A was a mixture of:
98.0% by weight of polyethylene terephthalate with an SV of 800 and
2.00% by weight of masterbatch made from 99.0% by weight of polyethylene terephthalate (SV of 800) and 0.5% by weight of SYLOBLOC® 44 H (colloidal $SiO_2$ from Grace) and 0.5% by weight of AEROSIL® TT 600 (chain-type $SiO_2$ from Degussa)
Base layer B:
100.0% by weight of polyethylene terephthalate with an SV of 800

Outer layer C was a mixture made from:
84.0% by weight of polyethylene terephthalate with an SV of 800 and
16.0% by weight of masterbatch made from 99. 0% by weight of polyethylene terephthalate and 0.5% by weight of SYLOBLOC® 44 H (Grace) and 0.5% by weight of AEROSIL® TT 600 (Degussa).

The process conditions in the individual steps were:

| Extrusion: | Temperatures | Layer A: | 300° C. |
|---|---|---|---|
| | | Layer B: | 300° C. |
| | | Layer C: | 300° C. |
| | Die gap width: | | 1 mm |
| | Temperature of take-off roll: | | 30° C. |
| Longitudinal stretching: | Temperature: | | 80–125° C. |
| | Longitudinal stretching ratio: | | 4 |
| Transverse stretching: | Temperature: | | 80–135° C. |
| | Transverse stretching ratio: | | 4 |
| Heat-setting: | Temperature: | | 230° C. |
| Duration: | | | 3 s |

Side A was coated with the copolyester by a method based on Example 1 of EP-A 0 144 878. The copolyester, with about 90 mol % of isophthalic acid and 10 mol % of the sodium salt of 5-sulfoisophthalic acid as acid component and 100 mol % of ethylene glycol as glycol component, was dispersed in water, the procedure being as in Example 1 of EP-A 0 144 878. However, unlike Example 1, the amount of a 50% aqueous dispersion of colloidal $SiO_2$ added was only 9.0 g instead of 11.2 g. As described in more detail in Example 1 of EP-A 0 144 878 the aqueous dispersion was applied to the polyester film after the longitudinal stretching procedure. After transverse stretching, the surface A of the film obtained has a coating with a dry weight of about 0.030 g/m², corresponding to a thickness of about 25 nm.

The film has very good optical properties and good processing performance (cf. Table 3).

After the film had been produced (as in this Example 1 and also in the comparative examples), its side A was metalized with aluminum in vacuo in an industrial metalizer. The coating rate was 8 m/s and the optical density was 2.6.

The film had the desired low oxygen permeation. Tables 2 and 3 give the film structure and the properties achieved in films produced in this way.

Comparative Example 1

A three-layer film was produced as in Example 1, except that unlike in Example 1 the concentrations of layer C were used for layer A. This is therefore an ABA or CBC film. The metalized version with thickness 12 μm does not have the barrier values required.

Comparative Example 2

A film was produced as in Example 1, except that the copolyester layer was absent. The film does not have the required adhesion to metal.

The present invention may be embodied in other specific forms without departing from its spirit or essential characteristics. The described embodiments are to be considered in all respects as illustrative only and not restrictive. The scope of the invention, is, therefore, indicated by the appended claims rather than by the foregoing description. All changes which come within the meaning and range of equivalency of the claims are to be embraced within their scope.

TABLE 2

| Example | Film thickness μm | Film structure | Layer thicknesses A B C | Pigments in the layers A | B | C | Average pigment diameter A | B | C | Pigment concentration A | B | C |
|---|---|---|---|---|---|---|---|---|---|---|---|---|
| Example 1 | 12 | ABC | 1.9/9.0/1.5 | Sylobloc 44 H Aerosil TT 600 | none | Sylobloc 44 H Aerosil TT 600 | 2.5 | | 2.5 | 100+ 100 | 0 | 800+ 800 |
| CE 1 | 12 | ABA | 1.5/9.0/1.5 | Sylobloc 44 H Aerosil TT 600 | none | Sylobloc 44 H Aerosil TT 600 | 2.5 | | 2.5 | 800+ 800 | 0 | 800+ 800 |
| CE 2 | 12 | ABC | 1.5/9.9/1.5 | Sylobloc 44 H Aerosil TT 600 | none | Sylobloc 44 H Aerosil TT 600 | 2.5 | | 2.5 | 100+ 100 | 0 | 800+ 800 |

TABLE 3

| Example | Constants for the height distribution of the particles $A_h$ side A/side C | $B_h$ side A/side C | Constants for the diameter distribution of the particles $A_d$ side A/side C | $B_d$ side A/side C | Oxygen permeability cm³/(m²bar d) | Adhesion to metal N/15 mm | Roughness $R_a$ side A mm | side C mm | Gloss[i] side A | side C | Haze[i] % | Processing performance |
|---|---|---|---|---|---|---|---|---|---|---|---|---|
| Ex. 1 | 1.3/ 2.45 | 1.5/ 2.6 | 3.3/ 2.4 | 3.5 3.1 | 0.85 | 3 | 25 | 60 | 185 | 180 | 1.9 | very good |
| CE 1 | 1.5/ 2.6 | 1.5/ 2.6 | 3.5/ 3.1 | 3.5/ 3.1 | 1.35 | 3.1 | 60 | 60 | 190 | 180 | 2.2 | very good |
| CE 2 | 1.3/ 2.45 | 1.5/ 2.6 | 3.3/ 2.4 | 3.5 3.1 | 0.43 | 1 | 22 | 60 | 190 | 180 | 1.8 | very good |

[i]measured on the unmetalized film
Side A: metalized outer layer
Side C: unmetalized outer layer

What is claimed is:

1. A biaxially oriented, coextruded polyester film, comprising at least two layers with a base layer B at least 80% by weight of which is composed of a thermoplastic polyester and with another layer applied to the base layer B, wherein at least one outward-facing layer A
   i) has, per mm² of film surface, a number N of elevations whose respective heights h and diameters d are correlated by the following equations:

$$\log N/mm^2 < A_h - B_h * \log h/\mu m,\ 0.05\ \mu m < h < 1.0\ \mu m \quad (1)$$

wherein $A_h = 1.4$; $B_h = 2.5$ $$\log N/mm^2 < A_d - B_d * \log d/\mu m,\ 0.2\ \mu m < d < 10.0\ \mu m \quad (2)$$

wherein $A_d = 3.4$; $B_d = 2.4$ and
   ii) has a copolyester coating, wherein said coating is composed of the condensation product of the following monomers or their derivatives capable of forming polyesters:
   A) from 65 to 95 mol % of isophthalic acid;
   B) from 0 to 30 mol % of at least one aliphatic dicarboxylic acid of formula $HOOC(CH_2)_nCOOH$, where n is from 1 to 11;
   C) from 5 to 15 mol % of at least one sulfomonomer containing an alkali metal sulfonate group on an aromatic moiety of a dicarboxylic acid;
   D) a copolymerizable aliphatic or cycloaliphatic glycol having 2 to 11 carbon atoms in the stoichiometric amount necessary to form 100 mol % of condensate; wherein each of the percentages given is based on the total amount of the monomers forming the polyester coating.

2. The polyester film as claimed in claim 1, wherein layer A comprises less than 0.06% by weight of an inert filler.

3. The polyester film as claimed in claim 1, wherein the thickness of the outward-facing layer A is from 0.1 to 3.0 μm.

4. The polyester film as claimed in claim 1, wherein the film is comprised of two layers: the base layer B and the outer layer A.

5. The polyester film as claimed in claim 1, wherein the film comprises three layers: the outward-facing outer layer A, the base layer B, said layer B having two sides, and a second outer layer C, wherein said outer layer C has been applied to the base layer B on its side facing away from the outer layer A.

6. The polyester film as claimed in claim 5, wherein the outer layer C has been pigmented.

7. The polyester film as claimed in claim 1, wherein the outer layer A has been pigmented.

8. The polyester film as claimed in claim 1, wherein at least one surface of the film has been metallized.

9. The polyester film as claimed in claim 8, wherein the oxygen permeability of the metallized film is $\leq 1.2\ cm^3/m$ bar d.

10. The polyester film as claimed in claim 8, wherein the oxygen permeability of the metallized film is $\leq 1.0\ cm^3/m^2$ bar d.

11. A process for producing a biaxially oriented, coextruded polyester film as claimed in claim 1, comprising coextruding polyester melts to form a prefilm of at least one outer layer A and the base layer B, and biaxially orienting and heat setting the prefilm, wherein at least one outward-facing outer layer A i) has, per mm² of film surface, a number a number N of elevations whose respective heights h and diameters d are correlated by the following equations:

$$\log N/mm^2 < A_h - B_h * \log h/\mu m, \quad 0.05\ \mu m < h < 1.0\ \mu m \quad (1)$$

wherein $A_h=1.4$, $B_h=2.5$ $$\log N/mm^2 < A_d - B_d * \log d/\mu m, \quad 0.2\ \mu m < d < 10.0\ \mu m \quad (2)$$

wherein $A_d=3.4$; $B_d=2.4$ and ii) has a copolyester coating composed of the condensation product of the following monomers and/or of their derivatives capable of forming polyesters:
  A) from 66 to 95 mol % of isophthalic acid;
  B) from 0 to 30 mol % of at least one aliphatic dicarboxylic acid of formula $HOOC(CH_2)_nCOOH$, where n is from 1 to 11;
  C) from 5 to 15 mol % of at least one sulfomonomer containing an alkali metal sulfonate group on an aromatic moiety of a dicarboxylic acid;
  D) a copolymerizable aliphatic or cycloaliphatic glycol having 2 to 11 carbon atoms in the stoichiometric amount necessary to form 100 mol % of condensate; wherein each of the percentages given is based on the total amount of the monomers forming the polyester coating.

12. The process for producing a biaxially oriented, coextruded polyester film as claimed in claim 11, in which recycled material is fed to the extrusion die at a concentration of from 10 to 60% by weight, based on the total weight of the film.

13. A method of packaging a consumable item, comprising applying an effective amount of a film of claim 1 to a consumable item to package said item.

* * * * *